(12) United States Patent
Cao

(10) Patent No.: US 11,216,187 B2
(45) Date of Patent: Jan. 4, 2022

(54) DATA WRITING AND READING METHOD AND APPARATUS, AND DISTRIBUTED OBJECT STORAGE CLUSTER

(71) Applicant: Hangzhou Hikvision Digital Technology Co., Ltd., Hangzhou (CN)

(72) Inventor: Li Cao, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 357 days.

(21) Appl. No.: 16/304,471

(22) PCT Filed: Nov. 9, 2016

(86) PCT No.: PCT/CN2016/105175
§ 371 (c)(1),
(2) Date: Nov. 26, 2018

(87) PCT Pub. No.: WO2017/201977
PCT Pub. Date: Nov. 30, 2017

(65) Prior Publication Data
US 2019/0146681 A1 May 16, 2019

(30) Foreign Application Priority Data
May 25, 2016 (CN) .......................... 201610351615.8

(51) Int. Cl.
*G06F 3/06* (2006.01)
*G06F 9/50* (2006.01)

(52) U.S. Cl.
CPC .............. *G06F 3/0608* (2013.01); *G06F 3/06* (2013.01); *G06F 3/0604* (2013.01); *G06F 3/064* (2013.01);
(Continued)

(58) Field of Classification Search
CPC ...... G06F 11/1469; G06F 3/064; G06F 3/067; G06F 3/6608; G06F 3/10
(Continued)

(56) References Cited

U.S. PATENT DOCUMENTS

2011/0219106 A1* 9/2011 Wright .............. G06F 15/17331
709/223
2011/0225209 A1 9/2011 Volvovski et al.
(Continued)

FOREIGN PATENT DOCUMENTS

CN 101504670 A 8/2009
CN 103608784 A 2/2014
(Continued)

OTHER PUBLICATIONS

International Search Report for International Application No. PCT/CN2016/105175 dated Feb. 16, 2017.

*Primary Examiner* — Baoquoc N To
(74) *Attorney, Agent, or Firm* — Clements Bernard Baratta; Lawrence A. Baratta, Jr.

(57) ABSTRACT

Embodiments of the present application disclose a data writing and apparatus, a data reading method and apparatus, and a distributed object storage cluster. The data writing method includes: receiving to-be-written data sent by a client in a distributed object storage cluster (S101), and dividing the to-be-written data into a plurality of pieces of sub-data and determining a sequence number of each piece of sub-data (S102); and writing each piece of sub-data into a corresponding network hard disk (S103); for each piece of sub-data, sends a correspondence between the sequence number of the piece of sub-data and identification information of a network hard disk into which the piece of sub-data is written to the metadata server in the distributed object storage cluster (S104). Each of pieces of sub-data into which the to-be-written data is divided is written into a correspond- (Continued)

ing network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

12 Claims, 3 Drawing Sheets

(52) U.S. Cl.
CPC ............ *G06F 3/067* (2013.01); *G06F 3/0667* (2013.01); *G06F 9/5016* (2013.01)

(58) Field of Classification Search
USPC .......................... 707/652; 711/162; 709/225
See application file for complete search history.

(56) References Cited

U.S. PATENT DOCUMENTS

| | | | |
|---|---|---|---|
| 2013/0086317 | A1 | 4/2013 | Nakano |
| 2014/0229763 | A1* | 8/2014 | Lou .................... G06F 11/2097 714/6.23 |

FOREIGN PATENT DOCUMENTS

| | | |
|---|---|---|
| CN | 103942112 A | 7/2014 |
| CN | 103955528 A | 7/2014 |
| CN | 105242881 A | 1/2016 |
| CN | 105260136 A | 1/2016 |
| CN | 105468300 A | 4/2016 |
| WO | 2016/053198 A1 | 4/2016 |

* cited by examiner

DATA WRITING AND READING METHOD AND APPARATUS, AND DISTRIBUTED OBJECT STORAGE CLUSTER

The present application claims the priority to a Chinese Patent Application No, 201610351615.8, filed with the China National Intellectual Property Administration on May 25, 2016 and entitled "DATA WRITING AND READING METHOD AND APPARATUS, AND DISTRIBUTED OBJECT STORAGE CLUSTER", which is incorporated herein by reference in its entirely.

TECHNICAL FIELD

The present application relates to the technical field of cloud storage, and in particular, to a data writing method and apparatus, a data reading method and apparatus, and a distributed object storage cluster.

BACKGROUND

Generally, a storage space in a storage device is pre-divided into a plurality of sub-storage spaces with a specific size, for example, a 100 M storage space is divided into 30 M, 30 M, and 40 M sub-storage spaces. In this case, in writing data into the storage device, the data can be written into a certain storage space of the storage device, for example, the 10 M of data is written into the 30 M sub-storage space of the storage device. However, during the writing process, the 10 M of data will occupy the 30 M storage space, and other data cannot be written into the 30 M storage space, thereby causing waste of resources.

In view of above drawbacks, in writing data currently, multiple small amounts of data are usually merged into one large amount of data and then written, for example, three 10 M files are merged and written into a 30 M sub-storage space, thereby avoiding the waste of resources. However, with this method, the writing of a 10 M file into a 30 M sub-storage space needs to wait for other files that can be merged. If there are no other files to be written yet, or currently the data sizes of other files to be written are not suitable, the efficiency of writing data will be very low.

SUMMARY

The object of the embodiments of the present application is to provide a data writing method and apparatus, a data reading method and apparatus, and a distributed object storage cluster, so as to improve the efficiency of writing and reading data.

In order to achieve the above object, an embodiment of the present application discloses a data writing method, which is applicable to a storage server in a distributed object storage cluster, wherein the distributed object storage cluster at least further includes network hard disks, and the method includes:

receiving to-be-written data sent by a client in the distributed object storage cluster, wherein the to-be-written data is sent by the client to a storage server specified by a metadata server in the distributed object storage cluster after the client sends a data write request to the metadata server;

dividing the to-be-written data into a plurality of pieces of sub-data, and determining a sequence number of each piece of sub-data;

writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server in the distributed object storage cluster.

Optionally, dividing the to-be-written data into a plurality of pieces of sub-data may include:

equally dividing the to-be-written data into a plurality of pieces of sub-data.

Optionally, equally dividing the to-be-written data into a plurality of pieces sub-data may include:

determining the number of pieces of sub-data into which the to-be-written data is to be equally divided, according to the number of the network hard disks in the distributed object storage cluster; and equally dividing the to-be-written data into the determined number of pieces of sub-data.

Optionally, equally dividing the to-be-written data into a plurality of pieces sub-data may include:

determining whether the to-be-written data can be equally divided; and if the to-be-written data cannot be equally divided, adding a supplemental bit at the end of the to-be-written data, so that the to-be-written data with the supplemental bit added can be equally divided, and equally dividing the to-be-written data with the supplemental bit added into the plurality of pieces of sub-data.

Optionally, the method may further include:

performing a preset data protection algorithm on the plurality of pieces of sub-data, to determine validation data of the to-be-written data;

writing the validation data into a corresponding network hard disk;

sending to the metadata server a correspondence between the validation data and the to-be-written data, and a correspondence between the validation data and identification information of a network hard disk into which the validation data is written.

In order to achieve the above object, an embodiment of the present application discloses a data reading method, which is applicable to a storage server in a distributed object storage cluster, wherein the distributed object storage cluster at least further includes network hard disks, and the method includes:

receiving a data access request sent by a client in the distributed object storage cluster, wherein the data access request carries a correspondence between a sequence number of each piece of sub-data of to-be-accessed data and identification information of a network hard disk, wherein the data access request is sent by the client to a storage server determined by a metadata server in the distributed object storage cluster after the client sends a data read request to the metadata server;

reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; and sending the combined to-be-accessed data to the client.

Optionally, the data access request further carries a target data amount of the to-be-accessed data.

Sending the combined to-be-accessed data to the client includes:

determining whether a supplemental bit exists in the combined to-be-accessed data according to a difference between a data amount of the combined to-be-accessed data and the target data amount;

if the supplemental bit exists in the combined to-be-accessed data, removing data of a data amount corresponding to the difference from the end of the combined to-be-accessed data; and sending to-be-accessed data with the data of the data amount corresponding to the difference removed to the client.

Optionally, the data access request further carries a correspondence between validation data and the to-be-accessed data, and a correspondence between the validation data and identification information of a network hard disk into which the validation data is written.

Sending the combined to-be-accessed data to the client includes:

obtaining the validation data of the to-be-accessed data stored in a network hard disk according to the correspondence between the validation data and the to-be-accessed data, and the correspondence between the validation data and the identification information of the network hard disk into which the validation data is written;

determining whether the combined to-be-accessed data is complete according to the validation data;

if the combined to-be-accessed data is complete, sending the combined to-be-accessed data to the client; and if the combined to-be-accessed data is not complete, generating sub-data that is missed in the to-be-accessed data by the validation data, combining the generated sub-data and the read sub-data into complete to-be-accessed data, and sending the complete to-be-accessed data to the client.

In order to achieve the above object, an embodiment of the present application discloses a data writing apparatus, which is applicable to a storage server in a distributed object storage cluster, wherein the distributed object storage cluster at least further includes network hard disks and the apparatus includes:

a first receiving module, configured for receiving to-be-written data sent by a client in the distributed object storage cluster, wherein the to-be-written data is sent by the client to a storage server specified by a metadata server in the distributed object storage cluster after the client sends a data write request to the metadata server;

a division module, configured for dividing the to-be-written data into a plurality of pieces of sub-data, and determining a sequence number of each piece of sub-data;

a first writing module, configured for writing each piece of sub-data into a corresponding network hard disk; and a first sending module, configured for, for each piece of sub-data of the to-be-written data, sending a correspondence between the sequence number of the piece of sub-data and identification information of a network hard disk into which the piece of sub-data is written to the metadata server in the distributed object storage cluster.

Optionally, the division module may be configured for:

equally dividing the to-be-written data into a plurality of pieces of sub-data.

Optionally, the division module may include:

a determination submodule, configured for determining the number of pieces of sub-data into which the to-be-written data is to be equally divided, according to the number of the network hard disks in the distributed object storage cluster;

a first division submodule, configured for equally dividing the to-be-written data into the determined number of pieces of sub-data.

Optionally, the division module may include:

a first determination submodule, configured for determining whether the to-be-written data can be equally divided; if the to-be-written data cannot be equally divided, triggering an adding submodule;

the adding submodule, configured for adding a supplemental bit at the end of the to-be-written data, so that the to-be-written data with the supplemental bit added can be equally divided; and a second division submodule, configured for equally dividing the to-be-written data with the supplemental bit added into the plurality of pieces of sub-data.

Optionally, the apparatus may further include:

an operation module, configured for performing a preset data protection algorithm on the plurality of pieces of sub-data, to determine validation data of the to-be-written data;

a second writing module, configured for writing the validation data into a corresponding network hard disk; and a second sending module, configured for sending to the metadata server a correspondence between the validation data and the to-be-written data, and a correspondence between the validation data and identification information of a network hard disk into which the validation data is written.

In order to achieve the above object, an embodiment of the present application further discloses a distributed object storage cluster, including a client, a metadata server, network hard disks, and the above storage server (or a storage server including the above data writing apparatus), wherein, the client is configured for sending a data write request to the metadata server; and sending to-be-written data to a storage server specified by the metadata server;

the metadata server is configured for specifying a storage server that receives the to-be-written data sent by the client according to the data write request sent by the client;

the storage server is configured for receiving the to-be-written data sent by the client; dividing the to-be-written data into a plurality of pieces of sub-data, and determining a sequence number of each piece of sub-data; writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server; and the network hard disk is configured for writing each piece of sub-data of the to-be-written data.

In order to achieve the above object, an embodiment of the present application discloses a data reading apparatus, which is applicable to a storage server in a distributed object storage cluster, wherein the distributed object storage cluster at least further includes network hard disks, and the method includes:

a second receiving module, configured for receiving a data access request sent by a client in the distributed object storage cluster, wherein the data access request carries a correspondence between a sequence number of each piece of sub-data of to-be-accessed data and identification information of a network hard disk, wherein the data access request is sent by the client to a storage server specified by a metadata server in the distributed object storage cluster after the client sends a data read request to the metadata server;

a combination module, configured for reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; and a third sending module, configured for sending the combined to-be-accessed data to the client.

Optionally, the data access request further carries a target data amount of the to-be-accessed data.

The third sending module may include:

a second determination submodule, configured for determining whether a supplemental bit exists in the combined to-be-accessed data according to a difference between a data amount of the combined to-be-accessed data and the target data amount; if the supplemental bit exists in the combined to-be-accessed data, triggering a removing submodule;

the removing submodule, configured for removing data of a data amount corresponding to the difference from the end of the combined to-be-accessed data; and a first sending submodule, configured for sending to-be-accessed data with the data of the data amount corresponding to the difference removed to the client.

Optionally, the data access request further carries a correspondence between validation data and the to-be-accessed data, and a correspondence between the validation data and identification information of a network hard disk into which the validation data is written.

The third sending module may include:

an obtaining submodule, configured for obtaining the validation data of the to-be-accessed data stored in a network hard disk according to the correspondence between the validation data and the to-be-accessed data, and the correspondence between the validation data and the identification information of the network hard disk into which the validation data is written;

a third determination submodule, configured for determining whether the combined to-be-accessed data is complete according to the validation data; if the combined to-be-accessed data is complete, triggering a second sending submodule, or if the combined to-be-accessed data is not complete, triggering a third sending submodule;

the second sending submodule, configured for sending the combined to-be-accessed data to the client; and the third sending submodule, configured for generating sub-data that is missed in the to-be-accessed data by the validation data, combining the generated sub-data and the read sub-data into complete to-be-accessed data, and sending the complete to-be-accessed data to the client.

In order to achieve the above object, an embodiment of the present application further discloses a distributed object storage cluster, including a client, a metadata server, a network hard disk, and the above storage server (or a storage server including the above data reading apparatus), wherein, the client is configured for sending a data read request to the metadata server; and sending a data access request to a storage server determined by the metadata server;

the metadata server is configured for determining a storage server that receives the data access request sent by the client according to the data read request sent by the client;

the storage server is configured for receiving the data access request sent by the client, wherein the data access request carries a correspondence between a sequence number of each piece of sub-data of the to-be-accessed data and identification information of a network hard disk; reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; sending the combined to-be-accessed data to the client; and the network hard disk is configured for storing each piece of sub-data of the to-be-accessed data.

In order to achieve the above object, an embodiment of the present application further discloses a storage server, including a housing, a processor, a memory, a circuit board, and a power circuit, wherein the circuit board is disposed within a space enclosed by the housing; the processor and the memory are disposed on the circuit board; the power circuit is configured for supplying power to various circuits or devices of the storage server; the memory is configured for storing an executable program code; and the processor is configured for executing a program corresponding to the executable program code by reading the executable program code stored in the memory, so as to perform the above data writing method.

In order to achieve the above object, an embodiment of the present application further provides an executable program code, wherein the executable program code is performs the data writing method when being executed.

In order to achieve the above object, an embodiment of the present application further provides a storage medium that stores an executable program code, wherein the executable program code performs the above data writing method when being executed.

In order to achieve the above object, an embodiment of the present application further discloses a storage server, including a housing, a processor, a memory, a circuit board, and a power circuit, wherein the circuit board is disposed within a space enclosed by the housing; the processor and the memory are disposed on the circuit board; the power circuit is configured for supplying power to various circuits or devices of the storage server; the memory is configured for storing an executable program code; and the processor is configured for executing a program corresponding to the executable program code by reading the executable program code stored in the memory, so as to perform the above data reading method.

In order to achieve the above object, an embodiment of the present application further provides an executable program code, wherein the executable program code performs the data reading method when being executed.

In order to achieve the above object, an embodiment of the present application further provides a storage medium that stores an executable program code, wherein the executable program code performs the above data reading method when being executed.

It can be seen from the above technical solutions, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the sub-data and identification information of a network hard disk into which the sub-data is written to the metadata server in the distributed object storage cluster. In the embodiments shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

Of course, the implementation of any product or method of the present application may not necessarily to achieve all of the advantages described above at the same time.

BRIEF DESCRIPTION OF THE DRAWINGS

In order to more clearly describe the technical solutions of the embodiments of the present application and in the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

In order to solve the above technical problems, an embodiment of the present application provides a data writing and reading method, an apparatus, and a distributed object storage cluster. It should be noted that the data writing and reading method and apparatus provided by the embodiment of the present application are preferably applicable to a storage server in a distributed object storage cluster, and the distributed object storage cluster may further include a client, a metadata server, and a network hard disk.

The network hard disk has the main function of data storage. The storage server has the main functions of caching data, operating data protection algorithm, writing data into and reading data from the network hard disk. The metadata server has the main functions of managing the name space of a file system, controlling the interaction between the client and the storage server, caching and synchronizing distributed metadata. The client can be understood as a user who needs to write or access data.

Figure 1:
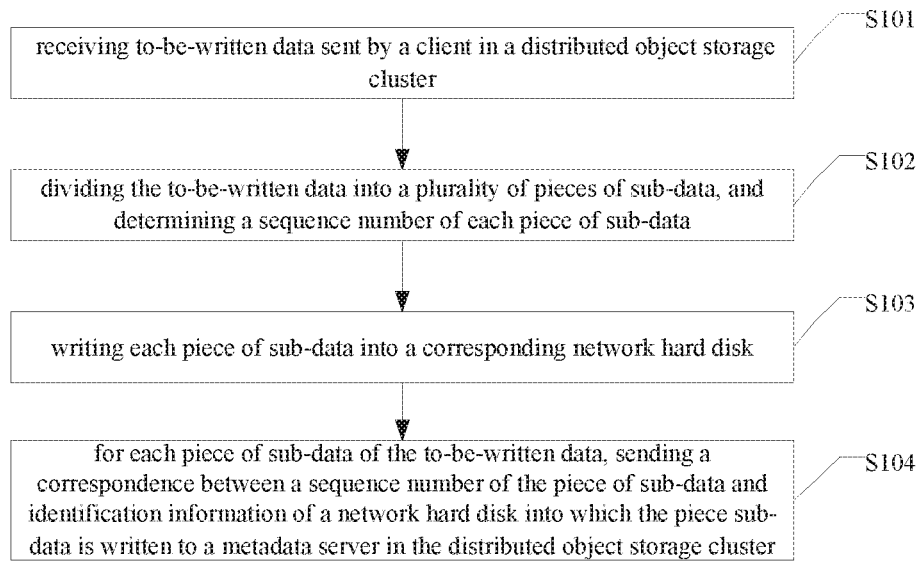
FIG. 1 is a schematic flowchart of a data writing method provided in an embodiment of the present application.

FIG. 1 is a schematic flowchart of a data writing method provided in an embodiment of the present application, including the following operations.

S101: receiving to-be-written data sent by a client in a distributed object storage cluster.

The to-be-written data is sent by the client to a storage server specified by the metadata server after the client sends a data write request to the metadata server in the distributed object storage cluster.

In an actual application, the process of sending to-be-written data by a client may include:

1. The client sends a data write request to the metadata server, wherein the data write request includes identification information of the to-be-written data.

Specifically, the identification information may be information that uniquely identifies the to-be-written data, such as a name, an ID number, and the like of the to-be-written data.

2. The metadata server determines address information of a storage server according to the data write request sent by the client, and sends the determined address information of the storage server to the client (the process of specifying a storage server).

Specifically, the address information may be an IP address. The metadata server can specify a storage server based on information such as resource utilization of the storage server.

3. The client sends the to-be-written data to the storage server according to the address information of the storage server determined by the metadata server.

S102: dividing the to-be-written data into a plurality of pieces of sub-data, and determining a sequence number of each piece of sub-data.

It is assumed that the to-be-written data is S, S is divided into a plurality of pieces of sub-data, and the sequence number of each piece of sub-data is determined.

In the embodiment shown in the present application, the to-be-written data may be equally divided into a plurality of pieces of sub-data. The equal division is beneficial to balance storage resources of the network hard disks. Of course, the to-be-written data may also be divided according to other ways, which is not limited here.

In the embodiment shown in the present application, the equal division of the to-be-written data into a plurality of pieces of sub-data may include:

determining whether the to-be-written data can be equally divided:

if so, equally dividing the to-be-written data into a plurality of pieces of sub-data directly;

if not, adding a supplemental bit at the end of the to-be-written data, so that the to-be-written data with the supplemental bit added can be equally divided; and equally dividing the to-be-written data with the supplemental bit added into a plurality of pieces of sub-data.

Specifically, in order to equally divide the to-be-written data S into a plurality of pieces of sub-data, the number of pieces of sub-data into which the to-be-written data is to be divided may be determined according to the number of network hard disks in the distributed object storage cluster, and the to-be-written data is equally divided into the determined number of pieces of sub-data.

Assuming that the distributed object storage cluster includes 4 network hard disks, the to-be-written data S may be equally divided into 4 pieces of sub-data.

First, it is determined whether the to-be-written data S can be equally divided. If so, the to-be-written data S is equally divided into 4 pieces of sub-data directly. If not, a supplementary bit is added at the end of the to-be-written data S, so that the to-be-written data S with the supplemental bit added can be equally divided; and the to-be-written data S with the supplemental bit added is equally divided into 4 pieces of sub-data. The supplement bit may be "0" or others, which is not limited here.

The sequence numbers of all pieces of sub-data are assumed to be determined respectively as: S1, S2, S3, S4.

S103: writing each piece of sub-data into a corresponding network hard disk.

It is assumed that S1 is written into a network hard disk A1, S2 is written into a network hard disk A2, S3 is written into a network hard disk A3, and S4 is written into a network hard disk A4. A1, A2, A3, and A4 are identification information of four network hard disks, respectively.

S104: for each piece of sub-data of the to-be-written data, sending a correspondence between the sequence number of the piece of sub-data and the identification information of a network hard disk into which the piece of sub-data is written to the metadata server in the distributed object storage cluster.

The correspondence of S1-A1, S2-A2, S3-A3, and S4-A4 is sent to the metadata server.

The correspondence between the sequence number of the piece of the sub-data and the identification information of the network hard disk into which the piece of sub-data is written belongs to the metadata information of the to-be-written data. The metadata server may store identification information of data, metadata information of the data, and a correspondence of address information of a storage server and the data.

In practical applications, data loss often occurs due to a failure of a device. In this case, some data protection algorithms, such as an EC (Erasure Coding) algorithm, are usually performed on original data to obtain validation data. With this method, even if partial data is missed, the original data can be complemented based on the validation data.

In another embodiment shown in the present application, a preset data protection algorithm may be performed on the plurality of pieces of sub-data to determine the validation data of the to-be-written data; and the validation data is written into a corresponding network hard disk. A correspondence between the validation data and the to-be-written data, and a correspondence between the validation data and the identification information of the network hard disk into which the validation data is written are sent to the metadata server.

Assuming that the preset data protection algorithm is an EC algorithm, the EC algorithm is performed on the plurality of sub-data, to obtain the validation data. It should be noted that, in order to perform the EC algorithm, it is required to ensure that the data amounts of the pieces of sub-data are equal, that is, it is required to equally divide the data. Further, the number of the divided pieces of sub-data and the number of the obtained pieces of validation data are preset. It is assumed that there are preset 5 divided pieces of sub-data and 2 obtained pieces of validation data.

The validation data is written into the corresponding network hard disk, that is, the sum of the number of the divided pieces of sub-data and the preset number of the pieces of validation data cannot be greater than the number of network hard disks in the distributed object storage cluster.

It is assumed that the distributed object storage cluster includes 10 network hard disks, the to-be-written data S is equally divided into 5 pieces of sub-data, and 2 pieces of validation data is SX and SY, wherein SX is written into the network hard disk A9, and SY is written into the network hard disk A10.

The correspondence between the validation data and the to-be-written data, and the correspondence between the validation data and the identification information of the network hard disk into which the validation data is written are sent to the metadata server.

The correspondence between SX, SY and the to-be-written data S, and SX-A9 and SY-A10 are sent to the metadata server.

In an actual application, an Object information table, a Strip information table, and a network hard disk information table may be stored in the metadata server. The Object information table can record Object_key (that is, identification information of data) and strip_id (strip_id indicating the sequence number of the sub-data) written by the Object data. The Strip information table can record strip_id and its corresponding network hard disk wwn (that is, the correspondence between the sequence number of the piece of sub-data and the identification information of the network hard disk; the network hard disk wwn indicates the identification information of the network hard disk) and unit_key (reading the specified data in the network hard disk according to the unit_key), The network hard disk information table can record the network hard disk ween and the address of the network hard disk. Additionally, the address information of the storage server may also be obtained by the metadata server.

The format of the Object information table may be shown in Table 1.

TABLE 1

| Field | Key | Remark |
|---|---|---|
| object_key | | indicating identification information of data |
| a set of strip_ids | | recording sequence numbers of the pieces of sub-data into which the data is divided |
| object_size | | indicating the size of the data |

The formal of the Strip information table may be shown in Table 2.

TABLE 2

| Field | Key | Remark |
|---|---|---|
| strip_id | | indicating identification information of data |
| a set of unit_keys | unit_key | a key on a network hard disk, the specified data in the network hard disk can be accessed according to this key |
| | wwn | indicating identification information of the network hard disk |
| EC_mode | | EC calculation mode: M pieces of validation data is obtained according to N pieces of sub-data (the number of the pieces of sub-data and the number of the pieces of validation data are recorded) |

The format of the network hard disk information table may be shown in Table 3.

TABLE 3

| Field | Key | Remark |
|---|---|---|
| wwn | | indicating identification information of a network hard disk |
| IP | | address information of a network hard disk |

It should be noted that the above formats of the Object information table, the Strip information table, and the network hard disk information table are only an exemplary description of partial content stored in the metadata server, and does not limit to the present application.

In the solution provided by the present application, a network hard disk is used. The characteristic of storing data in a network hard disk is that the space occupied by the stored data is the size of the data itself, for example, the space occupied by 100 KB of data in the network hard disk is 100 KB. Therefore, the waste of resources is avoided.

In the embodiment shown in FIG. 1, the storage server receives the to-be-written data sent by the client, and divides the to-be-written data into a plurality of pieces of sub-data; and writes each piece of sub-data into a corresponding network hard disk, for each piece of sub-data, sends the correspondence between the sequence number of the piece of sub-data and the identification information of the network hard disk into which the piece of sub-data is written to the metadata server in the distributed object storage cluster in the embodiment shown in the present application, each of pieces of sub-data into which the to-be-written data is divided, is written into a corresponding network hard disk. The storage characteristic of the network hard disk is that the space occupied by the stored data is the same as the size of the data itself. Therefore, the plurality of pieces of sub-data in which the to-be-written data is divided are written into respective network hard disks, and do not occupy redundant space, thereby avoiding the waste of resources. Furthermore, there is no need to wait for the data merging with other data, thereby improving the efficiency of reading and writing data.

Figure 2:
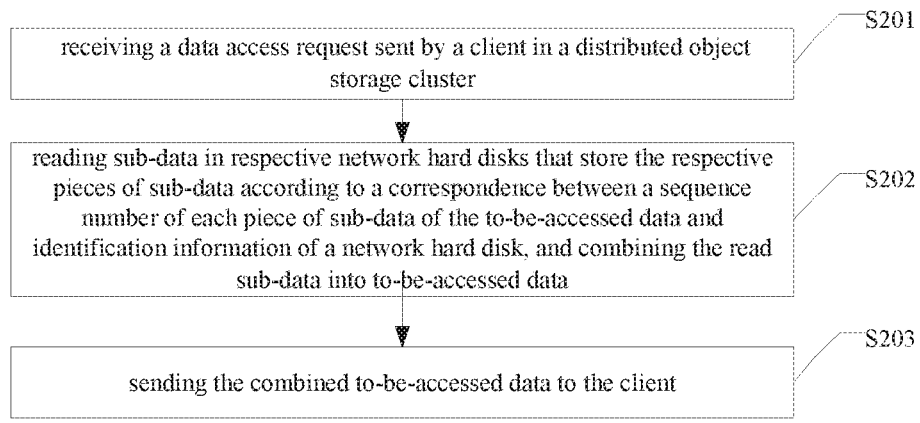
FIG. 2 is a schematic flowchart of a data reading method provided in an embodiment of the present application.

FIG. 2 is a schematic flowchart of a data reading method provided in an embodiment of the present application, including:

S101: receiving a data access request sent by a client in a distributed object storage cluster.

The data access request carries a correspondence between the sequence numbers of each piece of sub-data of the to-be-accessed data and the identification information of a network hard disk. The data access request is sent by the client to a storage server determined by a metadata server in the distributed object storage cluster after the client sends a data read request to the metadata server.

In an actual application, the process of sending a data access request by a client may include:

1. The client sends a data read request to the metadata server, wherein the data read request includes identification information of the to-be-accessed data.

Specifically, the identification information may be information that uniquely identifies the to-be-accessed data, such as a name, an ID number, and the like of the to-be-accessed data.

2. The metadata server searches for the metadata information of the to-be-accessed data and the address information of a storage server corresponding to the to-be-accessed data according to the identification information of the to-be-accessed data in the data read request sent by the client, and sends the metadata information of the to-be-accessed data and the address information of the storage server corresponding to the to-be-accessed data to the client (the process of determining a storage server).

Specifically, the metadata server stores identification information of data, metadata information of the data, and a correspondence between address information of a storage server and the data. The metadata information may include a correspondence between the sequence number of each piece of sub-data of the to-be-accessed data and the identi-fication information of a network hard disk, wherein the network hard disk is a network hard disk into which the sub-data is written.

3. The client sends a data access request to the storage server corresponding to the to-be-accessed data according to the metadata information of the to-be-accessed data and the address information of the storage server corresponding to the to-be-accessed data returned by the metadata server.

Specifically, the data access request carries the correspondence between the sequence number of each piece of sub-data of the to-be-accessed data and the identification information of a network hard disk. It is assumed that the to-be-accessed data is S, and the metadata information of S includes the correspondences of S1-A1, S2-A2, S3-A3 and S4-A4, wherein S1, S2, S3, and S4 are the sequence number of all pieces of sub-data, respectively, and A1 A2, A3, and A4 are identification information of four network hard disks, respectively.

S202: reading sub-data in respective network hard disks that store the respective pieces of sub-data according to the correspondence between the sequence number of each piece of sub-data of the to-be-accessed data and the identification information of a network hard disk, and combining the read sub-data into to-be-accessed data.

According to the correspondences of S1-A1 S2-A2, S3-A3 and S4-A4, the sub-data S1, S2, S3 and S4 are read in four network hard disks A1, A2, A3 and A4, and the read sub-data S1, S2, S3 and S4 are combined into the to-be-accessed data.

S203: sending the combined to-be-accessed data to the client.

As an implementation of the present application, the data access request may further carry the target data amount of the to-be-accessed data. In this case, the S203 may include determining whether there is a supplemental bit in the combined to-be-accessed data according to a difference between the data amount of the combined to-be-accessed data and the target data amount. If so, the data of the data amount corresponding to the difference is removed from the end of the combined to-be-accessed data; the to-be-accessed data with the data of the data amount corresponding to the difference removed is sent to the client.

The target data amount of the to-be-accessed data S is assumed to be 398 KB. After combining the read sub-data S1, S2, S3, and S4 into the to-be-accessed data, the difference between the data amount of the combined to-be-accessed data and the target data amount is calculated.

If in the process of writing the data S, the supplementary bit is added at the end of the data S in order to be able to divide the data S equally, the difference between the data amount of the combined to-be-accessed data and the target data amount of S is not 0. Therefore, whether there is a supplemental bit in the combined to-be-accessed data may be determined according to the difference between the data amount of the combined to-be-accessed data and the target data amount. When there is a supplemental bit in the combined to-be-accessed data, the data of the data amount corresponding to the difference is removed from the end of the combined to-be-accessed data, and the to-be-accessed data with the data of the data amount corresponding to the difference removed is sent to the client.

Assuming that in the process of writing data S, a 2 KB data amount is added at the end of the data S, and the data amount of the combined to-be-accessed data is 400 KB, and the difference between the data amount of the combined to-be-accessed data and the target data amount is 2 KB.

According to this difference, the 2 KB of data is removed from the end of the data S. The data S with the 2 KB of data removed is sent to the client.

As an implementation of the present application, when the to-be-accessed data has corresponding validation data, the data access request may further carry a correspondence between the validation data and the to-be-accessed data, and a correspondence between the validation data and the identification information of a network hard disk into which the validation data is written.

In this case, the S203 may include: according to the correspondence between the validation data and the to-be-accessed data and the correspondence between the validation data and the identification information of the network hard disk into which the validation data is written, obtaining the validation data of the to-be-accessed data stored in the network hard disk; determining whether the combined to-be-accessed data is complete according to the validation data; if so, sending the combined to-be-accessed data to the client; if not, generating sub-data that is missed in the to-be-accessed data by the validation data, combining the generated sub-data with the read sub-data into complete to-be-accessed data, and sending the complete to-be-accessed data to the client.

It is assumed that there are 2 pieces of validation data SX and SY in the to-be-accessed data S, the metadata server stores the correspondence between SX, SY and the to-be-written data S, and SX-A9 and SY-A10, wherein A9 is identification information of a network hard disk into which the validation data SX is written, and A10 is identification information of a network hard disk into which the validation data SY is written.

The validation data SX and SY of the to-be-accessed data S stored in the network hard disk is obtained according to the correspondence between the validation data and the to-be-accessed data, and the correspondence between the validation data and the identification information of the network hard disks into which the validation data is written, that is, the correspondence between SX, SY and the to-be-written data S, SX-A9 and SY-A10.

It is determined whether the combined to-be-accessed data is complete according to the validation data SX and SY. Specifically, the EC algorithm, the cyclic check code and the like may be used to check whether the original data is complete.

If so, the combined to-be-accessed data is sent to the client; if not, the missing sub-data is generated by the validation data SX and SY, the generated sub-data and the sub-data read from the network hard disk are combined into complete to-be-accessed data S, and the complete to-be-accessed data S is sent to the client.

In the embodiment shown in FIG. 2 of the present application, the storage server receives the data access request sent by the client, wherein the data access request carries the correspondence between the sequence number of each piece of sub-data of the to-be-accessed data and the identification information of a network hard disk; according to the correspondence between the sequence number of each piece of sub-data of the to-be-accessed data and the identification information of a network hard disk, reads sub-data in respective network hard disks that store the respective pieces of sub-data, and combines the read sub-data into the to-be-accessed data; and sends the combined to-be-accessed data to the client. In the embodiment shown in the present application, the storage server reads each piece of sub-data of the to-be-accessed data from the network hard disks according to the data access request from the client. The storage characteristic of the network hard disk is that the space occupied by the stored data is the same as the size of the data itself. Therefore, the application of the network hard disk to store data does not occupy the redundant space, thereby avoiding the waste of resources. Furthermore, there is no need to wait for merging the data with other data, thereby improving the efficiency of reading and writing data.

Corresponding to the above method embodiments, an embodiment of the present application further provides a data writing apparatus and reading apparatus.

Figure 3:
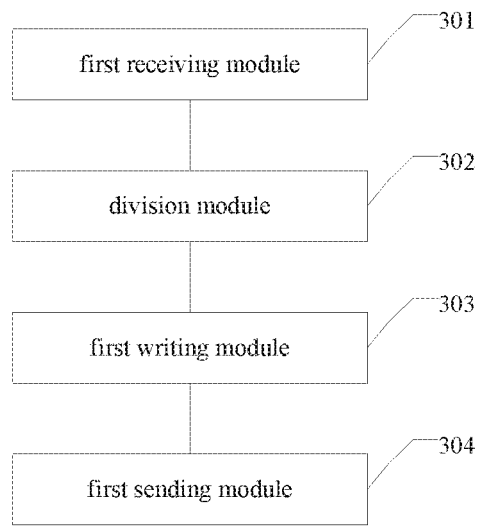
FIG. 3 is a schematic structural diagram of a data writing apparatus provided in an embodiment of the present application.

FIG. 3 is a schematic structural diagram of a data writing apparatus provided in an embodiment of the present application, including the following modules.

A first receiving module 301 is configured for receiving to-be-written data sent by a client in the distributed object storage cluster, wherein the to-be-written data is sent by the client to a storage server specified by a metadata server in the distributed object storage cluster after the client sends a data write request to the metadata server.

A division module 302 is configured for dividing the to-be-written data into a plurality of pieces of sub-data, and determining a sequence number of each piece of sub-data.

In the embodiment shown in the present application, the division module 302 is specifically configured for equally dividing the to-be-written data into a plurality of pieces of sub-data.

In the embodiment shown in the present application, the division module 302 may include a determination submodule and a first division submodule (not shown).

The determination submodule is configured for determining the number of pieces of sub-data into which the to-be-written data is to be equally divided, according to the number of the network hard disks in the distributed object storage cluster.

The first division submodule is configured for equally dividing the to-be-written data into the determined number of pieces of sub-data.

In the embodiment shown in the present application, the division module 302 may include a first determination submodule, an adding submodule and a second division submodule (not shown).

The first determination submodule is configured for determining whether the to-be-written data can be equally divided; if the to-be-written data cannot be equally divided, triggering an adding submodule; or if the to-be-written data can be equally divided, triggering the first division submodule.

The adding submodule is configured for adding a supplemental bit at the end of the to-be-written data, so that the to-be-written data with the supplemental bit added can be equally divided.

The second division submodule is configured for equally dividing the to-be-written data with the supplemental bit added into the plurality of pieces of sub-data.

A first writing module 303 is configured for writing each piece of sub-data into a corresponding network hard disk.

A first sending module 304 is configured for, for each piece of sub-data of the to-be-written data, sending a correspondence between the sequence number of the piece of sub-data and identification information of a network hard disk into which the piece of sub-data is written to the metadata server in the distributed object storage cluster.

In the embodiment shown in the present application, the apparatus may further include an operation module, a second writing module, and a second sending module (not shown).

The operation module is configured for performing a preset data protection algorithm on the plurality of pieces of sub-data, to determine validation data of the to-be-written data.

The second writing module is configured for writing the validation data into a corresponding network hard disk.

The second sending module is configured for sending to the metadata server a correspondence between the validation data and the to-be-written data, and a correspondence between the validation data and identification information of a network hard disk into which the validation data is written.

In the embodiment shown in FIG. 3, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the piece of sub-data and identification information of a network hard disk into which the piece of sub-data is written to the metadata server in the distributed object storage cluster. In the embodiments shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

Figure 4:
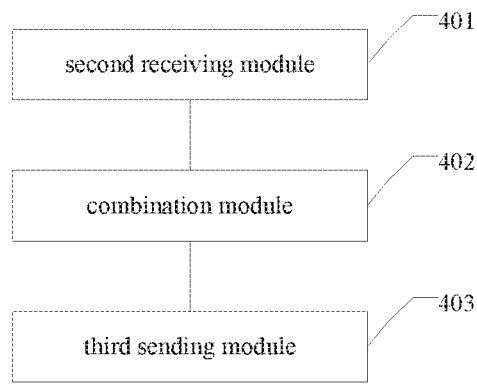
FIG. 4 is a schematic structural diagram of a data reading apparatus provided in an embodiment of the present application.

FIG. 4 is a schematic structural diagram of a data reading apparatus provided in an embodiment of the present application, including the following modules.

A second receiving module 401 is configured for receiving a data access request sent by a client in the distributed, object storage cluster, wherein the data access request carries a correspondence between a sequence number of each piece of sub-data of to-be-accessed data and identification information of a network hard disk, wherein the data access request is sent by the client to a storage server specified by a metadata server in the distributed object storage cluster after the client sends a data read request to the metadata server;

a combination module 402 is configured for reading sub-data in respective network hard disks that store the respective pieces of sub-data according to the correspondence between a sequence number of each piece of sub-data of the to-be-accessed data and identification information of a network hard disk, and combining the read sub-data into to-be-accessed data;

a third sending module 403 is configured for sending the combined to-be-accessed data to the client.

In the embodiment shown in the present application, the data access request further carries a target data amount of the to-be-accessed data. The third sending module 403 may include a second determination submodule, a removing submodule, and a first sending submodule (not shown).

The second determination submodule is configured for determining whether a supplemental bit exists in the combined to-be-accessed data according to a difference between a data amount of the combined to-be-accessed data and the target data amount; if the supplemental bit exists in the combined to-be-accessed data, triggering a removing submodule.

The removing submodule is configured for removing data of a data amount corresponding to the difference from the end of the combined to-be-accessed data.

The first sending submodule is configured for sending to-be-accessed data with the data of the data amount corresponding to the difference removed to the client.

In the embodiment shown in the present application, the data access request may further carry a correspondence between validation data and the to-be-accessed data, and a correspondence between the validation data and the identification information of a network hard disk into which the validation data is written. The third sending module 403 may include an obtaining submodule, a third determination submodule, a second sending submodule, and a third sending submodule (not shown).

The obtaining submodule is configured for obtaining the validation data of the to-be-accessed data stored in a network hard disk according to the correspondence between the validation data and the to-be-accessed data, and the correspondence between the validation data and the identification information of the network hard disk into which the validation data is written.

The third determination sub-module is configured for determining whether the combined to-be-accessed data is complete according to the validation data; if the combined to-be-accessed data is complete, triggering a second sending submodule, or if the combined to-be-accessed data is not complete, triggering a third sending submodule.

The second sending module is configured for sending the combined to-be-accessed data to the client.

The third sending submodule is configured for generating sub-data that is missed in the to-be-accessed data by the validation data, combining the generated sub-data and the read sub-data into complete to-be-accessed data, and sending the complete to-be-accessed data to the client.

In the embodiment shown in FIG. 4 of the present application, the storage server receives a data access request sent by the client, wherein the data access request carries a correspondence between a sequence number of each piece of sub-data of the to-be-accessed data and identification information of a network hard disk; according to the correspondence between a sequence number of each piece of sub-data of the to-be-accessed data and identification information of a network hard disk, reads sub-data in respective network hard disks that store the respective pieces of sub-data, and combines the read sub-data into the to-be-accessed data; sends the combined to-be-accessed data to the client. In the embodiment shown in the present application, the storage server reads each piece of sub-data of the to-be-accessed data from the network hard disks according to the data access request from the client. The storage characteristic of the network hard disk is that the space occupied by the stored data is the same as the size of the data itself. Therefore, the application of the network hard disk to store data does not occupy redundant space, thereby avoiding the waste of resources. Furthermore, there is no need to wait for merging the data with other data, thereby improving the efficiency of reading and writing data.

Figure 5:
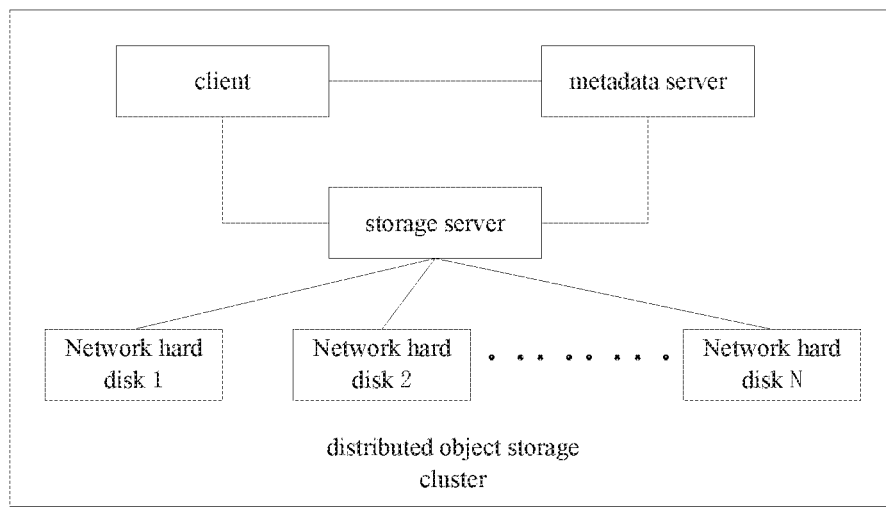
FIG. 5 is a schematic structural view of a distributed object storage cluster provided in an embodiment of the present application.

FIG. 5 is a schematic structural diagram of a distributed object storage cluster provided by an embodiment of the present disclosure. The distributed object storage cluster includes a storage server, a client, a metadata server, and N network hard disks (network hard disk 1, network hard disk 2 . . . network hard drive N).

In an embodiment of the present application, the client is configured for sending a data write request to the metadata server; and sending the to-be-written data to a storage server specified by the metadata server.

The metadata server is configured for specifying a storage server that receives the to-be-written data sent by the client according to the data write request sent by the client.

The storage server is configured for receiving the to-be-written data sent by the client; dividing the to-be-written data into a plurality of pieces of sub-data, and determining a sequence number of each piece of sub-data; writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server.

The network hard disk is configured for writing each piece of sub-data of the to-be-written data.

The flow of the data writing method in the above embodiment includes:

1. The client sends a data write request to the metadata server. The data write request includes identification information of the to-be-written data.

2. The metadata server specifies a storage server that receives the to-be-written data sent by the client according to the data write request sent by the client.

The specific process may include: determining, by the metadata server, address information of a storage server according to the data write request sent by the client, and sending the determined address information of the storage server to the client.

3. The client sends the to-be-written data to the storage server specified by the metadata server.

The specific process may include: sending, by the client, the to-be-written data to the storage server corresponding to the address information of the storage server determined by the metadata server.

4. The storage server receives the to-be-written data sent by the client; divides the to-be-written data into a plurality of pieces of sub-data and determines the sequence number of each piece of sub-data; writes each piece of sub-data into a corresponding network hard disk; for each piece of sub-data of the to-be-written data, sends the correspondence between the sequence number of the piece of sub-data and the identification information of a network hard disk into which the piece of sub-data is written to the metadata server.

In the above embodiment, the storage server receives the to-be-written data sent by the client, and divides the to-be-written data into a plurality of pieces of sub-data; and writes each piece of sub-data into a corresponding network hard disk; for each piece of sub-data, sends the correspondence between the sequence number of the piece of sub-data and the identification information of a network hard disk into which the piece of sub-data is written to the metadata server in the distributed object storage cluster in the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into a plurality of network hard disks, which does not occupy redundant space, thereby avoiding the waste of resources. Furthermore, there is no need to wait for merging the data with other data, thereby improving the efficiency of reading and writing data.

In another embodiment of the present application, in the distributed object storage cluster provided in FIG. 5, the client is configured for sending a data read request to the metadata server; and sending a data access request to a storage server determined by the metadata server.

The metadata server is configured for determining a storage server that receives the data access request sent by the client according to the data read request sent by the client.

The storage server is configured for receiving the data access request sent by the client, wherein the data access request carries a correspondence between a sequence number of each piece of sub-data of the to-be-accessed data and identification information of a network hard disk; reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; sending the combined to-be-accessed data to the client.

The network hard disk is configured for storing each piece of sub-data of the to-be-accessed data.

The flow of the data read method in the above embodiment includes:

1. The client sends a data read request to the metadata server. The data read request includes identification information of the to-be-accessed data.

2. The metadata server determines a storage server that receives the data access request sent by the client according to the data read request sent by the client.

The specific process may include: searching for, by the metadata server, metadata information of the to-be-accessed data and address information of a storage server corresponding to the to-be-accessed data according to the identification information of the to-be-accessed data in the data read request sent by the client, and sending the metadata information of the to-be-accessed data and the address information of the storage server corresponding to the to-be-accessed data to the client. The metadata information includes the correspondence between the sequence number of each piece of sub-data of the to-be-accessed data and the identification information of the network hard disk.

3. The client sends the data access request to the storage server determined by the metadata server.

The specific process may include: sending, by the client, a data access request to a storage server corresponding to the to-be-accessed data according to the metadata information of the to-be-accessed data and the address information of the storage server corresponding to the to-be-accessed data returned by the metadata server.

4. The storage server receives the data access request sent by the client, wherein the data access request carries a correspondence between a sequence number of each piece of sub-data of the to-be-accessed data and identification information of a network hard disk; according to the correspondence between a sequence number of each piece of sub-data of the to-be-accessed data and identification information of a network hard disk, reads sub-data in respective network hard disks that store the respective pieces of sub-data, and combines the read sub-data into the to-be-accessed data; and sends the combined to-be-accessed data to the client.

In the above embodiment, the storage server receives the data access request sent by the client, the data access request carries a correspondence between a sequence number of each piece of sub-data of the to-be-accessed data and identification information of a network hard disk; according to the correspondence between a sequence number of each piece of sub-data of the to-be-accessed data and identification information of a network hard disk, reads sub-data in respective network hard disks that store the respective pieces of sub-data, and combines the read sub-data into the to-be-accessed data; sends the combined to-be-accessed data to the client. In the embodiment shown in the present application, the storage server reads each piece of sub-data of the to-be-accessed data from the network hard disk according to the data access request from the client. The storage characteristic of the network hard disk is that the space occupied by the stored data is the same as the size of the data itself. Therefore, the application of the network hard disk to store data does not occupy redundant space, thereby avoiding the waste of resources. Furthermore, there is no need to wait for merging the data with other data, thereby improving the efficiency of reading and writing data.

Figure 6:
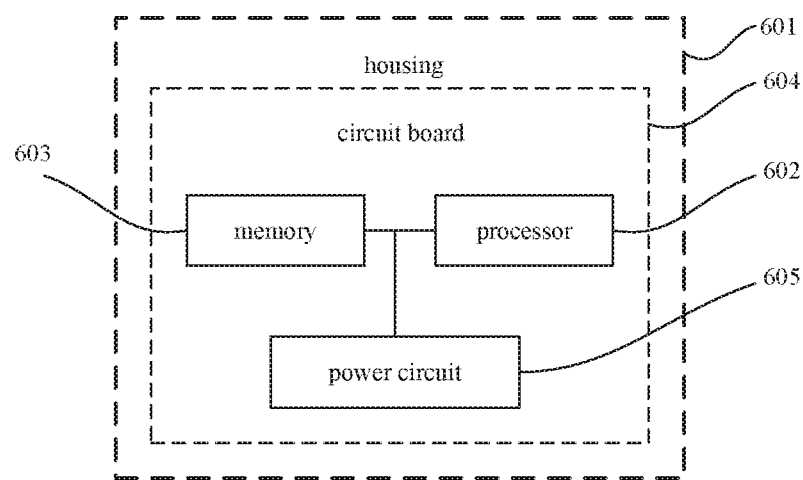
FIG. 6 is a schematic structural view of a storage server provided in an embodiment of the present application.

An embodiment of the present application further provides a storage server, as shown in FIG. 6, including a housing 601, a processor 602, a memory 603, a circuit board 604, and a power circuit 605, wherein the circuit board 604 is disposed within a space enclosed by the housing 601; the processor 602 and the memory 603 are disposed on the circuit board 604; the power circuit 605 is configured for supplying power to various circuits or devices of the storage server; the memory 603 is configured for storing an executable program code; and the processor 602 is configured for executing a program corresponding to the executable program code by reading the executable program code stored in the memory 603, so as to execute the data writing method including:

receiving to-be-written data sent by a client in the distributed object storage cluster, wherein the to-be-written data is sent by the client to a storage server specified by a metadata server in the distributed object storage cluster after the client sends a data write request to the metadata server;

dividing the to-be-written data into a plurality of pieces of sub-data, and determining a sequence number of each piece of sub-data;

writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server in the distributed object storage cluster.

In the embodiment shown in FIG. 6 of the present application, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the piece of sub-data and identification information of a network hard disk into which the piece of sub-data is written to the metadata server in the distributed object storage cluster. In the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

An embodiment of the present application further provides executable a program code, wherein the executable program code performs a data writing method when being executed. The method includes:

receiving to-be-written data sent by a client in the distributed object storage cluster, wherein the to-be-written data is sent by the client to a storage server specified by a metadata server in the distributed object storage cluster after the client sends a data write request to the metadata server;

dividing the to-be-written data into a plurality of pieces of sub-data, and determining a sequence number of each piece of sub-data;

writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server in the distributed object storage cluster.

In the embodiment shown in the present application, the storage server receives the to-be-written data sent by the client and divides the to-be-written data into a plurality of pieces of sub-data; and writes each piece of sub-data into a corresponding network hard disk; for each piece of sub-data sends a correspondence between a sequence number of the piece of sub-data and identification information of a network hard disk into which the piece of sub-data is written to the metadata server in the distributed object storage cluster. In the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

An embodiment of the present application further provides a storage medium, wherein the storage medium is configured for storing an executable program code that performs a data writing method when being executed. The method includes:

receiving to-be-written data sent by a client in the distributed object storage cluster, wherein the to-be-written data is sent by the client to a storage server specified by a metadata server in the distributed object storage cluster after the client sends a data write request to the metadata server;

dividing the to-be-written data into a plurality of pieces of sub-data, and determining a sequence number of each piece of sub-data;

writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server in the distributed object storage cluster.

In the embodiment shown in the present application, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the piece of sub-data and identification information of a network hard disk into which the piece of sub-data is written to the metadata server in the distributed object storage cluster. In the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

An embodiment of the present application further provides a storage server, as shown in FIG. 6, including a housing 601, a processor 602, a memory 603, a circuit board 604, and a power circuit 605, wherein the circuit board 604 is disposed within a space enclosed by the housing 601, the processor 602 and the memory 603 are disposed on the circuit board 604; the power circuit 605 is configured for supplying power to various circuits or devices of the storage server; the memory 603 is configured for storing executable program code; and the processor 602 is configured for executing a program corresponding to the executable program code by reading the executable program code stored in the memory 603, so as to execute the data reading method, the method including:

receiving a data access request sent by a client in the distributed object storage cluster, wherein the data access request carries a correspondence between a sequence number of each piece of sub-data of to-be-accessed data and identification information of a network hard disk, wherein the data access request is sent by the client to a storage server determined by a metadata server in the distributed object storage cluster after the client sends a data read request to the metadata server;

reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; and sending the combined to-be-accessed data to the client.

In the embodiment shown in FIG. 6 of the present application, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the piece of sub-data and identification information of a network hard disk into which the piece of sub-data is written to the metadata server in the distributed object storage cluster. In the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

An embodiment of the present application further provides an executable program code, wherein the executable program code performs a data reading method when being executed. The method includes:

receiving a data access request sent by a client in the distributed object storage cluster, wherein the data access request carries a correspondence between a sequence number of each piece of sub-data of to-be-accessed data and identification information of a network hard disk, wherein the data access request is sent by the client to a storage server determined by a metadata server in the distributed object storage cluster after the client sends a data read request to the metadata server;

reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; and sending the combined to-be-accessed data to the client.

In the embodiment shown in the present application, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the piece of sub-data and identification information of a network hard disk into which the piece of sub-data is written to the metadata server in the distributed object storage cluster. In the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

An embodiment of the present application further provides a storage medium, wherein the storage medium is configured for storing an executable program code that performs a data reading method when being executed. The method includes:

receiving a data access request sent by a client in the distributed object storage cluster, wherein the data access request carries a correspondence between a sequence number of each piece of sub-data of to-be-accessed data and identification information of a network hard disk, wherein the data access request is sent by the client to a storage server determined by a metadata server in the distributed object storage cluster after the client sends a data read request to the metadata server;

reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; and sending the combined to-be-accessed data to the client.

In the embodiment shown in the present application, the storage server receives the to-be-written data sent by the client, and divides the to-be-written data into a plurality of pieces of sub-data; and writes each piece of sub-data into a corresponding network hard disk; for each piece of sub-data, sends a correspondence between a sequence number of the piece of sub-data and identification information of a network hard disk into which the piece of sub-data is written to the metadata server in the distributed object storage cluster. In the embodiment shown in the present application, each of pieces of sub-data into which the to-be-written data is divided is written into a corresponding network hard disk. The storage characteristic of the network hard disk is that the space occupied by the stored data is the same as the size of the data itself. Therefore, the plurality of pieces of sub-data into which the to-be-written data is divided are written into respective network hard disks, which does not occupy redundant space, thereby avoiding the waste of resources. Furthermore, there is no need to wait for merging the data with other data, thereby improving the efficiency of reading and writing data.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s)" and "included" do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A data reading method, which is applicable to a storage server in a distributed object storage cluster, wherein the distributed object storage cluster at least further comprises network hard disks, and the method comprises:
    receiving a data access request sent by a client in the distributed object storage cluster, wherein the data access request carries a correspondence between a sequence number of each piece of sub-data of to-be-accessed data and identification information of a network hard disk, wherein the data access request is sent by the client to a storage server determined by a metadata server in the distributed object storage cluster after the client sends a data read request to the metadata server;
    reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; and
    sending the combined to-be-accessed data to the client;
    wherein the data access request further carries a correspondence between validation data and the to-be-accessed data, and a correspondence between the validation data and identification information of a network hard disk into which the validation data is written;
    wherein sending the combined to-be-accessed data to the client comprises:
    obtaining the validation data of the to-be-accessed data stored in a network hard disk according to the correspondence between the validation data and the to-be-accessed data, and the correspondence between the validation data and the identification information of the network hard disk into which the validation data is written;
    determining whether the combined to-be-accessed data is complete according to the validation data;
    if the combined to-be-accessed data is complete, sending the combined to-be-accessed data to the client; and
    if the combined to-be-accessed data is not complete, generating sub-data that is missed in the to-be-accessed data by the validation data, combining the generated sub-data and the read sub-data into complete to-be-accessed data, and sending the complete to-be-accessed data to the client.

2. The method of claim 1, wherein the data access request further carries a target data amount of the to-be-accessed data;
    wherein sending the combined to-be-accessed data to the client comprises:
    determining whether a supplemental bit exists in the combined to-be-accessed data according to a difference between a data amount of the combined to-be-accessed data and the target data amount;
    if the supplemental bit exists in the combined to-be-accessed data, removing data of a data amount corresponding to the difference from the end of the combined to-be-accessed data;
    sending to-be-accessed data with the data of the data amount corresponding to the difference removed to the client.

3. A storage server, comprising a housing, a processor, a memory, a circuit board, and a power circuit, wherein the circuit board is disposed within a space enclosed by the housing; the processor and the memory are disposed on the circuit board; the power circuit is configured for supplying power to various circuits or devices of the storage server; the memory is configured for storing an executable program code; and the processor is configured for executing a program corresponding to the executable program code by reading the executable program code stored in the memory, so as to perform the data reading method of claim 1.

4. A non-transitory computer readable storage medium for storing an executable program code, wherein the executable program code performs the data reading method of claim 1 when being executed.

5. A distributed object storage cluster, comprising a client, a metadata server, network hard disks, and a storage server, wherein the client is configured for sending a data read request to the metadata server; and sending a data access request to a storage server determined by the metadata server;

the metadata server is configured for determining a storage server that receives the data access request sent by the client according to the data read request sent by the client;

the storage server is configured for receiving the data access request sent by the client, wherein the data access request carries a correspondence between a sequence number of each piece of sub-data of the to-be-accessed data and identification information of a network hard disk; reading sub-data in respective network hard disks that store the respective pieces of sub-data according to the correspondence between a sequence number of each piece of sub-data of the to-be-accessed data and identification information of a network hard disk, and combining the read sub-data into to-be-accessed data; sending the combined to-be-accessed data to the client;

wherein the data access request further carries a correspondence between validation data and the to-be-accessed data, and a correspondence between the validation data and identification information of a network hard disk into which the validation data is written;

wherein sending the combined to-be-accessed data to the client comprises:

obtaining the validation data of the to-be-accessed data stored in a network hard disk according to the correspondence between the validation data and the to-be-accessed data, and the correspondence between the validation data and the identification information of the network hard disk into which the validation data is written;

determining whether the combined to-be-accessed data is complete according to the validation data;

if the combined to-be-accessed data is complete, sending the combined to-be-accessed data to the client; and if the combined to-be-accessed data is not complete, generating sub-data that is missed in the to-be-accessed data by the validation data, combining the generated sub-data and the read sub-data into complete to-be-accessed data, and sending the complete to-be-accessed data to the client;

the network hard disk is configured for storing each piece of sub-data of the to-be-accessed data.

6. A data writing method, which is applicable to a storage server in a distributed object storage cluster, wherein the distributed object storage cluster at least further comprises network hard disks, and the method comprises:

receiving to-be-written data sent by a client in the distributed object storage cluster, wherein the to-be-written data is sent by the client to a storage server specified by a metadata server in the distributed object storage cluster after the client sends a data write request to the metadata server;

dividing the to-be-written data into a plurality of pieces of sub-data, and determining a sequence number of each piece of sub-data;

writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server in the distributed object storage cluster;

wherein the method further comprises:

performing a preset data protection algorithm on the plurality of pieces of sub-data, to determine validation data of the to-be-written data;

writing the validation data into a corresponding network hard disk;

sending to the metadata server a correspondence between the validation data and the to-be-written data, and a correspondence between the validation data and identification information of a network hard disk into which the validation data is written.

7. The method of claim 6, wherein dividing the to-be-written data into a plurality of pieces of sub-data comprises:

equally dividing the to-be-written data into a plurality of pieces of sub-data.

8. The method of claim 7, wherein equally dividing the to-be-written data into a plurality of pieces of sub-data comprises:

determining the number of pieces of sub-data into which the to-be-written data is to be equally divided, according to the number of the network hard disks in the distributed object storage cluster; and equally dividing the to-be-written data into the determined number of pieces of sub-data.

9. The method of claim 7, wherein equally dividing the to-be-written data into a plurality of pieces of sub-data comprises:

determining whether the to-be-written data can be equally divided; and if the to-be-written data cannot be equally divided, adding a supplemental bit at the end of the to-be-written data, so that the to-be-written data with the supplemental bit added can be equally divided, and equally dividing the to-be-written data with the supplemental bit added into the plurality of pieces of sub-data.

10. A storage server, comprising a housing, a processor, a memory, a circuit board, and a power circuit, wherein the circuit board is disposed within a space enclosed by the housing; the processor and the memory are disposed on the circuit board; the power circuit is configured for supplying power to various circuits or devices of the storage server; the memory is configured for storing an executable program code; and the processor is configured for executing a program corresponding to the executable program code by reading the executable program code stored in the memory, so as to perform the data writing method of claim 6.

11. A non-transitory computer readable storage medium for storing an executable program code, wherein the executable program code performs the data writing method of claim 6 when being executed.

12. A distributed object storage cluster, comprising a client, a metadata server, network hard disks, and a storage server, wherein the client is configured for sending a data write request to the metadata server; and sending to-be-written data to a storage server specified by the metadata server;

the metadata server is configured for specifying a storage server that receives the to-be-written data sent by the client according to the data write request sent by the client;

the storage server is configured for receiving the to-be-written data sent by the client; dividing the to-be-written data into a plurality of pieces of sub-data, and determining a sequence number of each piece of sub-data; writing each piece of sub-data into a corresponding network hard disk; and for each piece of sub-data of the to-be-written data, sending a correspondence between the sequence number of the piece of sub-data and identification information of a network hard disk into which the piece of sub-data is written to the metadata server;

the storage server is further configured for performing a preset data protection algorithm on the plurality of pieces of sub-data, to determine validation data of the to-be-written data; writing the validation data into a corresponding network hard disk; and sending to the metadata server a correspondence between the validation data and the to-be-written data, and a correspondence between the validation data and identification information of a network hard disk into which the validation data is written; and the network hard disk is configured for writing each piece of sub-data of the to-be-written data.

* * * * *